under 35 U.S.C. 154(b) by 269 days.

(12) United States Patent
Kukreja et al.

(10) Patent No.: US 12,535,448 B2
(45) Date of Patent: Jan. 27, 2026

(54) IN-LINE QUALITY INSPECTION OF METAL FOILS DURING PRODUCTION

(71) Applicant: GM GLOBAL TECHNOLOGY OPERATIONS LLC, Detroit, MI (US)

(72) Inventors: Ratandeep Singh Kukreja, Auburn Hills, MI (US); Michael P. Balogh, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 269 days.

(21) Appl. No.: 18/508,897

(22) Filed: Nov. 14, 2023

(65) Prior Publication Data

US 2025/0155399 A1    May 15, 2025

(51) Int. Cl.
*G01N 27/24* (2006.01)
*G01N 27/22* (2006.01)
*G01N 33/2045* (2019.01)

(52) U.S. Cl.
CPC .......... *G01N 27/24* (2013.01); *G01N 27/226* (2013.01); *G01N 33/2045* (2019.01)

(58) Field of Classification Search
CPC .. G01N 27/24; G01N 27/226; G01N 33/2045; G01N 33/20; G01N 33/204; G01N 27/228; G01N 27/22; G01N 33/0078; G01R 19/0084; G01R 19/0092; G01R 19/0023; G01R 19/00; G01R 19/30; G01R 19/28; G01R 33/00; G01R 33/0094; G01R 35/00; H01M 4/86; H01M 8/04544; H01M 8/04574; H01M 8/04664; H01M 8/1004; G01B 7/087; G01B 1/00; G01B 5/30; G01B 7/00; G01B 7/30; G01B 7/34; G01B 7/345; G01B 7/02; G01B 7/06; G01B 7/08
See application file for complete search history.

(56) References Cited

U.S. PATENT DOCUMENTS

| | | | | |
|---|---|---|---|---|
| 5,798,650 | A | * 8/1998 | Guth | ........................ B32B 15/08 324/711 |
| 2004/0076493 | A1 | * 4/2004 | Tsuboi | .................. B29C 63/044 413/1 |
| 2012/0313650 | A1 | * 12/2012 | Kawaguchi | ......... H01M 10/058 324/679 |

(Continued)

FOREIGN PATENT DOCUMENTS

CN        107560531 A       1/2018

OTHER PUBLICATIONS

German Office Action from counterpart DE1020241000759, dated Aug. 1, 2024.

*Primary Examiner* — Alvaro E Fortich

(57) ABSTRACT

A system for inline inspection of an elongate strip of metal foil includes at least one pair of opposed conductive rollers each having a surface of dielectric material thereon, and a circuit electrically connecting the rollers, and a sensor for detecting changes in the capacitance between the rollers. A method of inspecting metal foil includes passing the metal foil between at least one pair of opposed conductive rollers, each roller of the pair having a surface of dielectric material thereon in contact with an opposite side of the foil, and measuring changes in an electrical property in an electrically powered circuit connecting the rollers to identify defects in the portion of the foil between the rollers.

16 Claims, 4 Drawing Sheets

(56) References Cited

U.S. PATENT DOCUMENTS

| | | | |
|---|---|---|---|
| 2015/0061693 A1* | 3/2015 | Knudson | H01M 8/04 |
| | | | 324/537 |
| 2020/0055139 A1* | 2/2020 | Wang | B23K 11/16 |
| 2023/0198034 A1 | 6/2023 | Huemiller et al. | |

* cited by examiner

IN-LINE QUALITY INSPECTION OF METAL FOILS DURING PRODUCTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

This disclosure relates to systems and methods for in-line quality inspection of metal foil, in particular for the in-line inspection of metal foils such as lithium.

In the production of batteries (and other products), defect-free metal foils are required. For example, the metal foils can be used as current collectors and/or active material layers of battery cells. Some foil defects are visible, and can be readily detected by visual inspection. However, many foil defects are not readily detectable by visual inspection, and without more sophisticated techniques can end up being incorporated into finished products.

SUMMARY

Embodiments of this disclosure provide systems and methods for inspection of metal foils. According to a first embodiment, a system is provided for inline inspection of an elongate strip of metal foil. The system comprises at least one pair of opposed conductive rollers. Each roller of the pair has a layer of dielectric material thereon, forming a dielectric surface. A circuit is electrically connected to each roller in the pair, and includes a sensor for detecting changes in the capacitance between the rollers. Changes in capacitance can be determined directly, or via measurement of some other electrical property of the circuit.

The system can employ multiple pairs of rollers extending transversely across the width of the foil to scan substantially all of the foil strip, and/or spaced longitudinally along the length of the foil strip to provide multiple scans of the same portions of the strip.

According to a second embodiment, a method of inspecting metal foil comprises passing the metal foil strip between at least one pair of opposed conductive rollers. Each roller of the pair has a surface of a surface of dielectric material thereon in contact with opposite sides of the foil. The method further comprises measuring changes in an electrical property in an electrically powered circuit connecting the rollers to identify defects in the portion of the foil between the rollers.

In some versions of the second embodiment, the electrical property measured in the circuit connecting the rollers is the capacitance across the rollers. In other versions of the second embodiment, the electrical property measured in the circuit connecting the rollers can be the voltage across the two opposed rollers. In still other versions of the first embodiment, the electrical property measured in the circuit connecting the rollers is current in the circuit.

The methods of the second embodiment can employ multiple pairs of rollers extending transversely across the width of the foil to scan substantially all of the foil strip, and/or spaced longitudinally along the length of the foil to provide multiple scans of the same portions of the strip.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Embodiments of this disclosure provide systems and methods for inspection of metal foils, such as lithium metal foils used in the manufacture of batteries.

Figure 1:
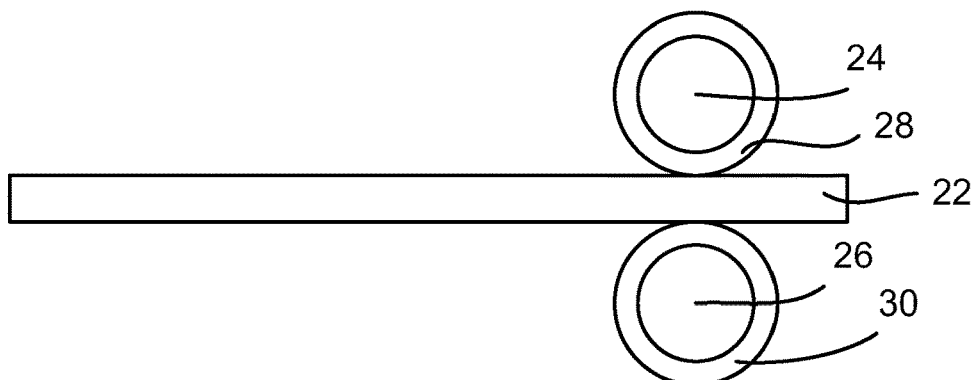
FIG. 1 is a schematic side elevation view of the system for performing an inspection of metal foil strip according to a first embodiment of this disclosure.
Figure 2:
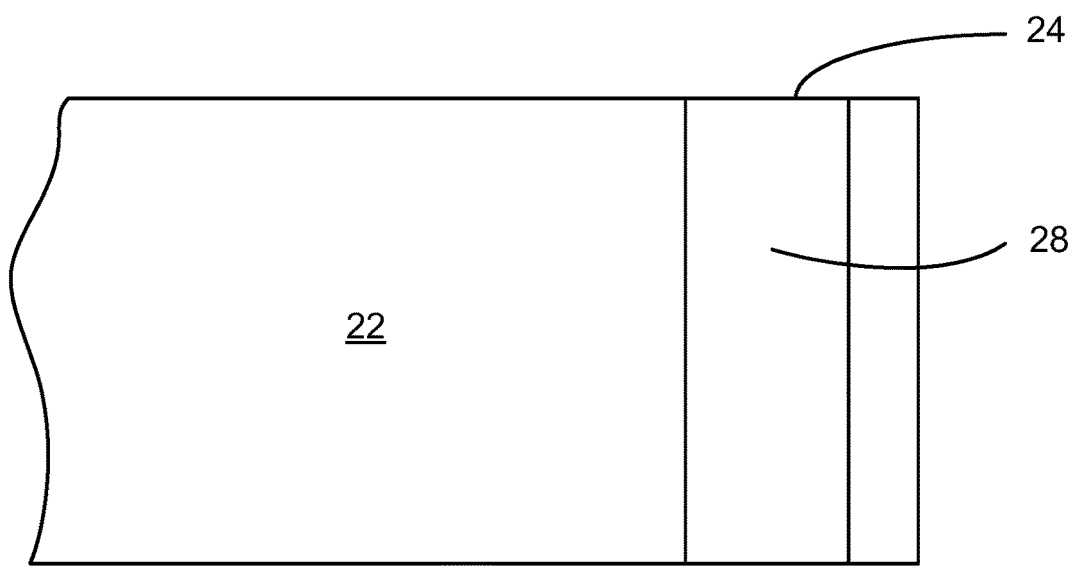
FIG. 2 is a schematic top plan view of the system for performing an inspection of metal foil according to the first embodiment of this disclosure.

A system for inspecting an elongate sheet of metal foil according to the principles of this disclosure is indicated generally as 20 in FIGS. 1 and 2. The system 20 comprises a pair of opposed conductive rollers 24, 26, as shown schematically in FIGS. 1 and 2. The rollers 24, 26 are covered with a layer of dielectric material providing a surface of dielectric material for contacting the surface of the metal foil strip 22. This dielectric material can be any non-conducting (insulating) material of appropriate durability, such as rubber, epoxy, composites, glass, or ceramic, that is dimensionally stable. One or both of the rollers 24, 26 can be resiliently biased against the metal foil strip 22 so that their dielectric surfaces remain in contact with opposite sides of the foil strip.

A circuit 32 is electrically connected to each of the rollers 24, 26 and can include a sensor 34 for detecting changes in the capacitance between the rollers, The changes in capacitance can be determined directly, or via measurement of some other electrical property of the circuit 32.

Figure 4:
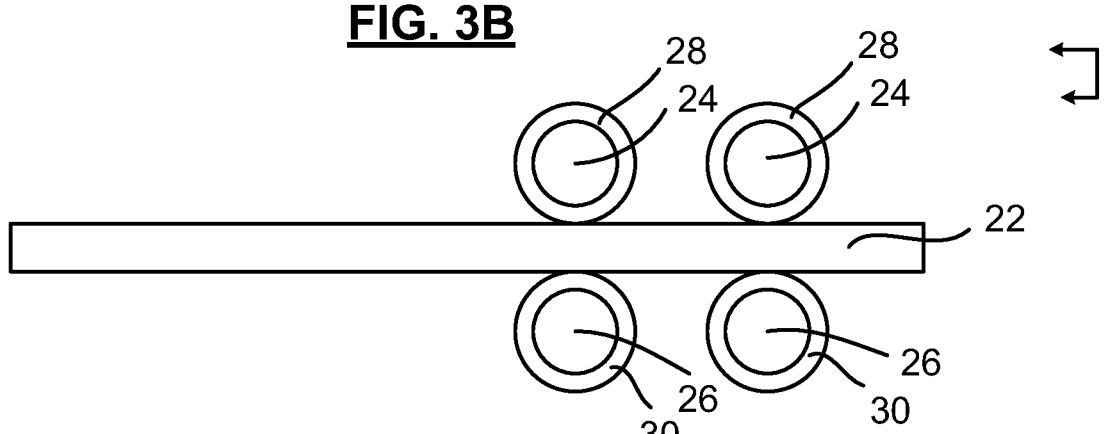
FIG. 4 is a schematic side elevation view of the system for performing an inspection of metal foil according to the first embodiment of this disclosure, showing two longitudinally spaced pairs of rollers.
Figure 5:
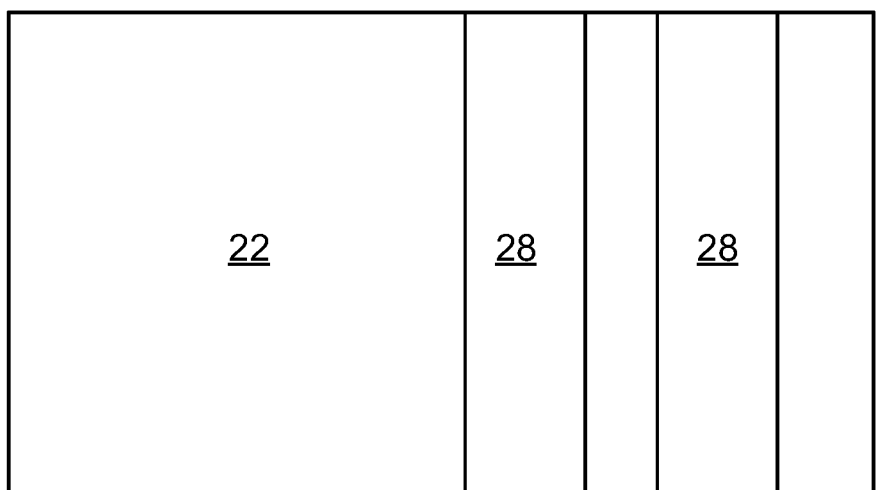
FIG. 5 is a schematic top plan view of the system for performing an inspection of metal foil according to the first embodiment of this disclosure, showing two longitudinally spaced pairs of rollers.

As shown in FIGS. 4 and 5, the system 20 can include two or more pairs of rollers 24, 26. This allows double checking of the metal foil strip 22, so that the presence or absence of a defect can be confirmed.

Figure 6:
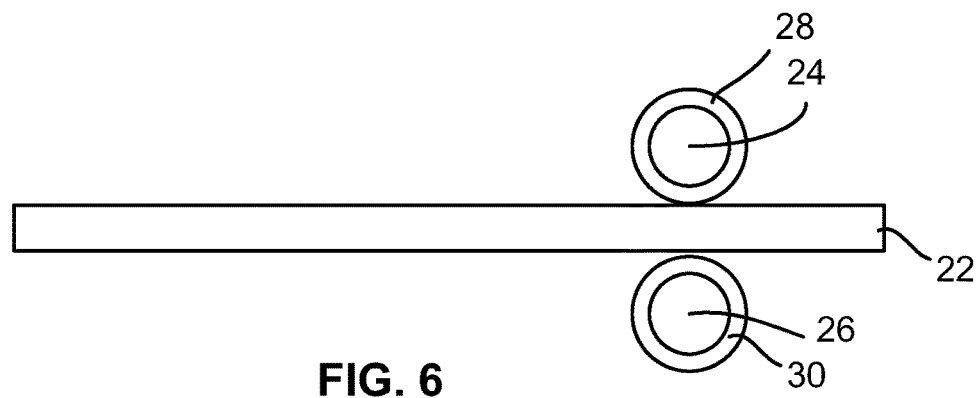
FIG. 6 is a schematic side elevation view of the system for performing an inspection of metal foil according to the first embodiment of this disclosure, showing two transversely aligned spaced pairs of rollers extending across the width of the foil strip.
Figure 7:
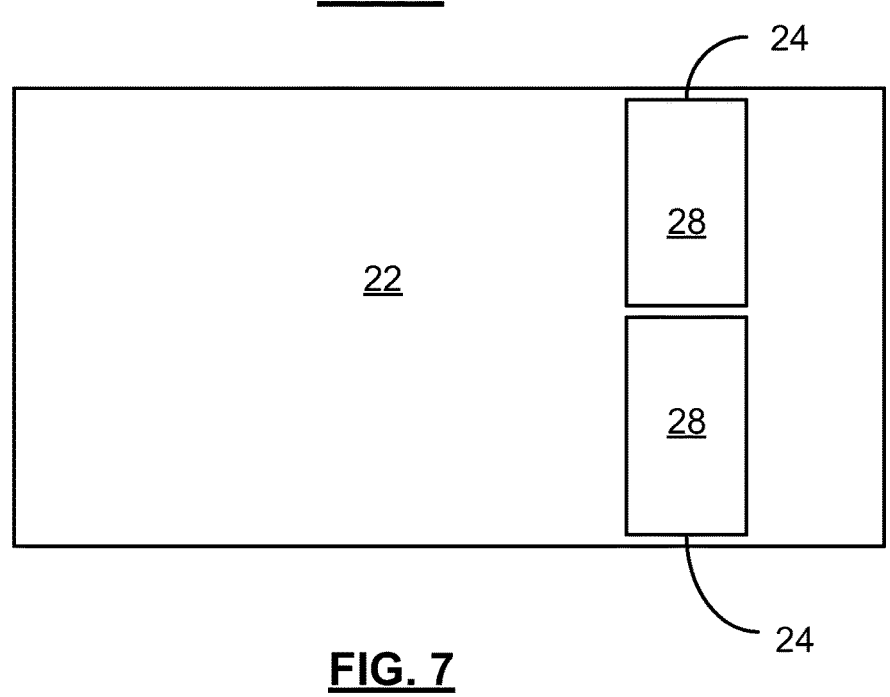
FIG. 7 is a schematic top plan view of the system for performing an inspection of metal foil according to the first embodiment of this disclosure, showing two transversely aligned spaced pairs of rollers extending across the width of the foil.

As shown in FIGS. 6 and 7, instead of a pair of long rollers extending across with the width of the metal foil strip 22, two or more pairs of rollers 24, 26, can extend transversely across the metal foil strip. This configuration allows the location of defects to be pinpointed more accurately across the width of the foil strip 22.

Figure 8:
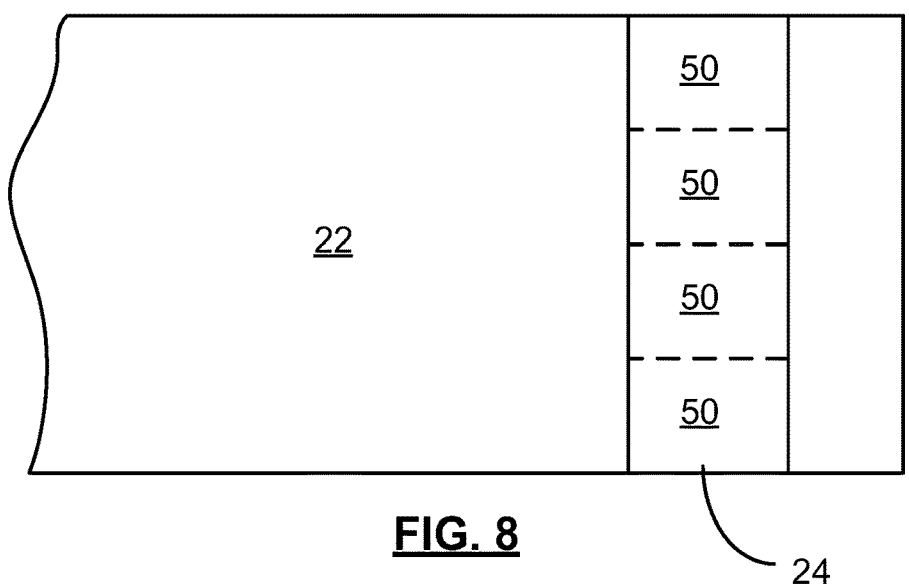
FIG. 8 is a schematic top plan view of the system for performing an inspection of metal foil according to the method of the first embodiment of this disclosure, showing multiple zones on the rollers.

An alternate construction of the roller pairs 24, 26 is shown in FIG. 8. Each roller is divided into a plurality of separate sections 50 (four sections as shown in FIG. 8). The sections 50 on each of the rollers 24, 26 are aligned so that there are a plurality of aligned sections across the width of the foil strip 22. This is similar to the construction in FIGS. 6 and 7, with each set of aligned sections 50 operating similarly to the separate pairs of rollers.

According to a second embodiment, a method of inspecting metal foil strips 22 comprises passing the metal foil strip between at least one pair of opposed conductive rollers 24, 26, as shown schematically in FIGS. 1 and 2. As described above, the rollers 24, 26 have layers 28, 30 of dielectric material, providing the rollers with a dielectric surface. One or both of the rollers 24, 26 can be resiliently biased against the passing metal foil strip 22 so that their dielectric-clad surfaces 28, 30 remain in contact with opposite sides of the metal foil strip.

The dielectric surfaces of the rollers 24, 26 and the metal foil strip 22 between them, form a capacitor structure, with the conductive rollers serving as the plates. The capacitance of this capacitor structure is approximated by the formula $C=\varepsilon_0 KA/d$ where $\varepsilon_0$ is the electric constant; K is the relative permittivity of the material between the conductive portion of the rollers 24, 26; A is the effective area of overlap of the rollers 24, 26; and d is the distance between the conductive portion of the rollers 24, 26.

Figure 9:
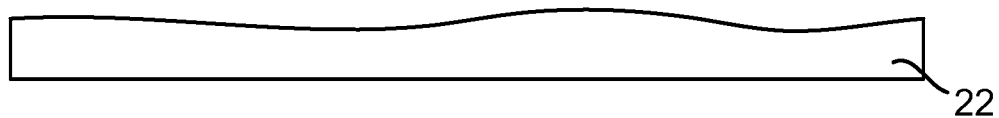
FIG. 9 is a partial longitudinal cross-sectional view of metal foil showing variable thickness defect.
Figure 10:
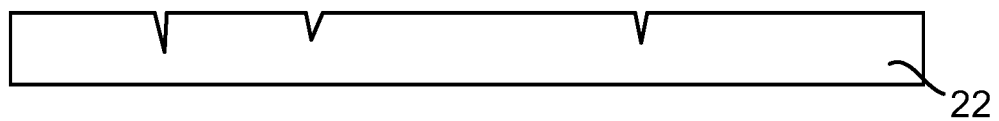
FIG. 10 is a partial longitudinal cross-sectional view of metal foil showing crack defects.
Figure 11:
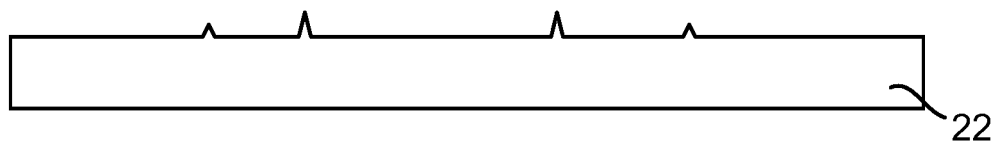
FIG. 11 is a partial longitudinal cross-sectional view of metal foil showing surface roughness defects.
Figure 12:
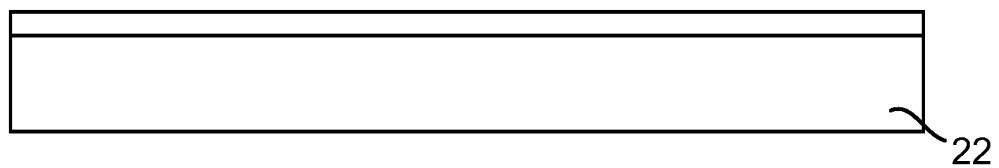
FIG. 12 is a partial longitudinal cross-sectional view of metal foil showing surface layer defects.

The method further comprises detecting changes in the capacitance between the rollers 24, 26 which correspond to defects in the metal foil strip 22 between the rollers. For example, changes in the thickness of the foil strip 22 as would occur with variable thickness defects of the type illustrated in FIG. 9 would change the distance d and possibly the dielectric constant K of the material between the rollers, and thus change C. Cracks and other gaps in the foil of the type illustrated in FIG. 10 could change the distance d, and possibly the dielectric constant K of the material between the rollers, and the area A of overlap between the rollers, and thus change C. Surface roughness defects of the type illustrated in FIG. 11 would change the distance d, and thus change C. Finally, material on the surface of the foil would change the distance d and possibly the dielectric constant K of the material between the rollers, and thus change C.

By monitoring the capacitance C between the rollers, it is possible to identify changes in capacitance which are indicative of defects in the foil between the rollers. The areas of the foil that correspond to the changes in capacitance can be marked on the foil, so that the defective portions can be removed or excluded from use in products.

Figure 3A:
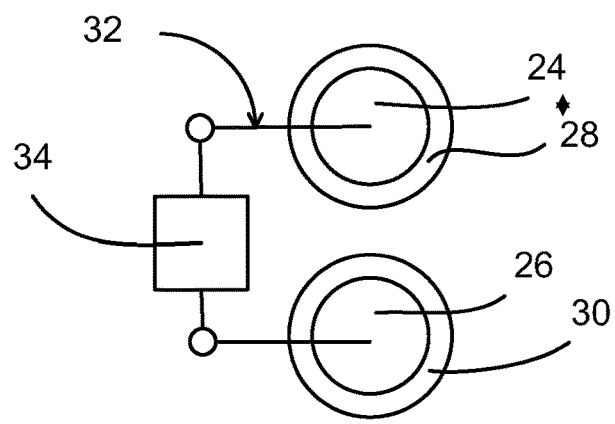
FIG. 3A is a diagram for a circuit for connecting a pair of rollers.
Figure 3B:
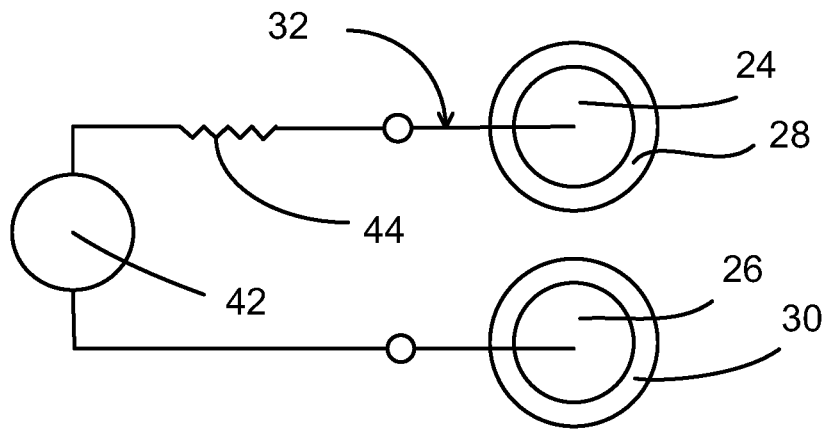
FIG. 3B is a diagram for an alternate circuit for connecting a pair of rollers.

One way to monitor the capacitance is to measure it directly across points A B in circuit 32 in FIG. 3A with a capacitor sensor 34. Alternatively, as shown in FIG. 3B, a power supply 42 and resistor 44 can be incorporated into the circuit 32, and changes in capacitance can be monitored indirectly, for example by measuring some other electrical property in the circuit representative of a change in capacitance between the rollers 24, 26, such as changes in the current through, or voltage across, resistor 34.

As shown in FIGS. 4 and 5, the metal foil strip 22 can pass through two or more pairs of rollers 24, 26. By comparing capacitance changes between multiple pairs of rollers, the presence or absence of a defect can be confirmed.

As shown in FIGS. 6 and 7, instead of a pair of long rollers 24, 26 extending across with the width of the foil, two or more pairs of rollers can extend transversely across the foil strip. This configuration allows the location of defects to be pinpointed more accurately across the width of the foil strip.

In an alternate construction of the roller pairs is shown in FIG. 8, each of the rollers 24 and 26 is divided into a plurality of separate sections (four as shown in FIG. 8). The sections 50 on each roller 24, 26 are aligned so that there are a plurality of aligned sections across the width of the metal foil strip. In this arrangement, similar to the construction in FIGS. 6 and 7, each set of aligned sections operates similarly to separate rollers, and permits more precise location of the detected defects.

A marking apparatus, such as an ink jet printer, can be disposed adjacent to the rollers 24, 26 and can be triggered to mark the position where a defect has been detected.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A method of inspecting metal foil strip comprising:
passing the metal foil strip between at least one pair of opposed conductive rollers, each roller of each pair having a surface of dielectric material thereon in contact with an opposite side of the foil;
measuring changes in an electrical property in an electrically powered circuit connecting the pair of opposed conductive rollers to identify defects in the portion of the metal foil strip between the rollers.

2. The method according to claim 1 wherein the measured electrical property is the capacitance across the pair of opposed conductive rollers.

3. The method according to claim 1 wherein the measured electrical property is the voltage in a portion of the circuit connecting the pair of opposed conductive rollers that indicates a change in the capacitance between the pair of opposed conductive rollers.

4. The method according to claim 1 wherein the measured electrical property is the current in a portion of the circuit connecting the two opposed conductive rollers that indicates a change in the capacitance between the two opposed conductive rollers.

5. The method according to claim 1 wherein the dielectric material on the pair of opposed conductive rollers is epoxy.

6. The method according to claim 1 wherein the dielectric material on the pair of opposed conductive rollers has a thickness of between about 0.5 mm and about 2 mm.

7. The method according to claim 1 wherein the rollers of each pair of opposed conductive rollers have the same diameter.

8. The method according to claim 1 wherein there are a plurality of electrically isolated zones disposed along the length of each roller of the pair of opposed conductive rollers, with each zone on one roller being disposed opposite a zone on the other roller, and wherein the step of measuring changes in an electrical property in an electrically powered circuit connecting the rollers, comprises measuring changes in an electrical property in electrically powered circuits connecting opposing zones on the pair of rollers to identify defects in the portion of the foil between the opposing zones of the pair of rollers.

9. The method according to claim 8 wherein the measured electrical property is the capacitance across the pair of opposed conductive rollers.

10. The method according to claim 8 wherein the electrical property measured is voltage drop in a portion of the circuit connecting the two opposed rollers that indicates a change in the capacitance between the pair of opposed conductive rollers.

11. The method according to claim 8 wherein the electrical property measured is current in a portion of the circuit connecting the pair of opposed conductive rollers that indicates a change in the capacitance between the pair of opposed conductive rollers.

12. The method according to claim 1 comprising passing the metal foil strip successively between at least two pairs of opposed conductive rollers, the roller of each pair of opposed conductive rollers having a dielectric surface thereon in contact with an opposite side of the metal foil strip; and measuring changes in an electrical property in an electrically powered circuit connecting the rollers of each pair of opposed conductive rollers to identify defects in the portions of the metal foil between each pair of rollers.

13. The method according to claim 1 wherein the step of passing the metal foil strip between two opposed conductive rollers comprises passing the metal foil strip between a plurality of pairs of opposed rollers arranged transversely across a width of the metal foil strip.

14. A system for inline inspection of an elongate strip of metal foil, the system comprising at least one pair of opposed conductive rollers each roller having a surface of dielectric material thereon, and a circuit electrically connecting the rollers of each pair of opposed conductive rollers, and a sensor for measuring an electrical property of the circuit indicative of a change in the capacitance between each pair of opposed conductive rollers to detect defects in a portion of the elongate strip of metal foil disposed between the opposed conductive rollers.

15. The system according to claim 14 wherein there are a plurality of pairs of rollers disposed transversely across a width of the strip, to inspect substantially the entire width of the strip.

16. The system according to claim 14 wherein there are a plurality of electrically isolated zones disposed along the length of each of the opposed conduct rollers in the pair, with each zone on one roller being disposed opposite a zone on the other roller.

* * * * *